United States Patent [19]

Harding

[11] 4,340,433
[45] Jul. 20, 1982

[54] METHOD OF HEAT TREATING ARTICLES

[75] Inventor: Brian Harding, West Bromwich, England

[73] Assignee: CAN-ENG Holdings Limited, Ontario, Canada

[21] Appl. No.: 112,576

[22] Filed: Jan. 16, 1980

Related U.S. Application Data

[63] Continuation-in-part of Ser. No. 831,308, Sep. 7, 1977, abandoned.

[30] Foreign Application Priority Data

Sep. 16, 1976 [GB] United Kingdom ............... 38339/76

[51] Int. Cl.³ .............................................. C21D 1/74
[52] U.S. Cl. .................................... 148/16; 148/20.3
[58] Field of Search ...................... 148/16, 20.3, 13.2, 148/16.5, 16.6, 16.7

[56] References Cited

U.S. PATENT DOCUMENTS

| | | | |
|---|---|---|---|
| 2,607,666 | 8/1952 | Martin | 48/62 |
| 2,763,478 | 9/1956 | Parry | 263/21 |
| 2,835,483 | 5/1958 | Lindsay | 263/41 |
| 3,053,704 | 9/1962 | Munday | 148/20.3 |
| 3,477,703 | 11/1969 | Tamalet | 263/40 |
| 3,630,501 | 12/1971 | Shabaker | 263/19 B |
| 3,804,581 | 4/1974 | Schmalfeld et al. | 432/58 |
| 3,861,862 | 1/1975 | Steever et al. | 432/58 |
| 3,863,577 | 2/1975 | Steever et al. | 110/8 R |
| 3,888,194 | 6/1975 | Kishigami et al. | 110/8 F |
| 3,907,674 | 9/1975 | Roberts et al. | 210/20 |
| 4,058,069 | 11/1977 | Baing et al. | 110/8 F |
| 4,069,107 | 1/1978 | Koppelman et al. | 201/12 |
| 4,075,953 | 2/1978 | Sowards | 110/8 F |

*Primary Examiner*—R. Dean
*Attorney, Agent, or Firm*—Steele, Gould & Fried

[57] ABSTRACT

This invention relates to a method of heat treating articles which utilizes a fluidized bed comprising a container containing a mass of refractory particles and having a porous base, a layer of such particles adjacent to the porous base being formed of heavier particles than the remainder of said refractory particles. According to the invention, a non-stoichiometric fluidizing and treatment medium is supplied to the underside of the porous base and flows therethrough into the mass of refractory particles at such a velocity as to leave the heavier particles unfluidized while fluidizing the remainder of the particles. A gaseous medium is also introduced into the container at a position above and spaced from the porous base to together with the non-stoichiometric fluidizing and treatment medium, a combustible mixture which is ignited to heat the mass of refractory particles to a temperature at which the non-stoichiometric fluidizing and treatment medium will carry out the desired heat treatment.

3 Claims, 4 Drawing Figures

METHOD OF HEAT TREATING ARTICLES

CROSS REFERENCES

This application is a continuation-in-part of co-pending application Ser. No. 831,308 filed Sept. 7, 1977, now abandoned.

BACKGROUND OF THE INVENTION

1. Field of the Invention

This invention relates to a method of heat treating articles by immersing them in a fluidised bed.

2. Description of the Prior Art

It is known in the heat treatment of articles to provide a fluidised bed, which is formed of refractory articles, and means for supplying a gas, or gas/air mixture, which not only provides a sufficient velocity of gas or gas/air flow for fluidising the bed but which also provides within the bed the desired atmosphere for providing the required heat treatment process, it being understood that heat will also be supplied in any convenient manner. Examples of such heat treatment processes are carbo-nitriding, oxy-carbo-nitriding, carburizing, neutral annealing, natural stress relieving, and neutral hardening, the gas or gas/air mixture admitted to the bed in these cases having an appropriate composition to provide the correct atmosphere for the required treatment. The heat treatment of articles in a fluidised bed also includes processes in which paint or plastics material coatings are removed from painted or coated metal articles.

It is common practice, in constructing a fluidised bed, to make use of a porous bottom such as may be provided by a porous ceramic tile through which a gas/air mixture can be blown. It is also known to arrange that the gas and air shall be pre-mixed, externally of the fluidised bed, to provide a stoichiometric mixture which can then be ignited so as to provide a burning gaseous mixture which not only fluidises the bed but also heats the refractory particles of the bed. Ignition initially takes place just above the top of the bed and the flame front then moves downwardly into the bed. Such an arrangement does however present three problems. Firstly, the presence of a stoichiometric gas/air mixture outside the fluidised bed constitutes an explosion risk and fire hazard. Secondly, because a stoichiometric mixture is passing through the porous tile, the flame front will eventually reach or approach close to the tile and the temperatures to which the tile is then subjected may cause breakdown of the tile material or tile fixing material. Thirdly, the bed will be fluidised by the burning gases whereas in order to obtain good temperature control and optimum fluidising conditions it is desirable that the fuel input rate and the fluidising velocity should be independently variable.

OBJECT AND BRIEF SUMMARY OF THE INVENTION

One object of the present invention is to provide an improved method of heat treating articles in a fluidised bed which avoids the above-mentioned disadvantage of known methods of operating fluidised beds for heat treatment purposes.

In accordance with the invention there is provided a method of heat treating articles in a fluidised bed comprising a container having a porous base and containing a mass of refractory particles, a layer of refractory particles immediately adjacent to said porous base being formed of heavier particles than the remainder of the refractory particles, wherein a non-stoichoimetric fluidising and treatment medium is supplied to the underside of said porous base and allowed to flow therethrough and into the mass of refractory particles at such a velocity as will leave said heavier refractory particles unfluidised while fluidising the remainder of the refractory particles and wherein a gaseous medium is introduced into said container at a position above and spaced from said porous base to form with said non-stoichiometric fluidising and treatment medium a combustible mixture which is ignited to heat said mass of refractory particles.

The invention will now be more particularly described with reference to the accompanying drawings.

DETAILED DESCRIPTION OF THE PREFERRED EMBODIMENTS

Figure 1:
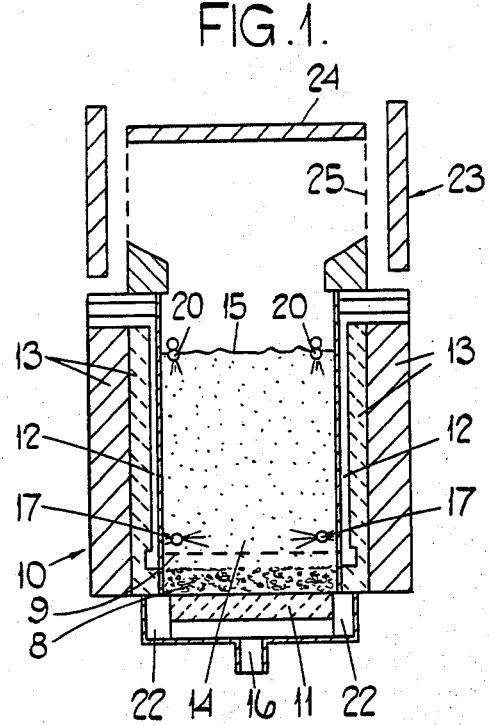
FIG. 1 is a schematic sectional view of a fluidised bed which can be used in carrying out one example of a method in accordance with the invention.

Referring firstly to FIG. 1, the fluidised bed shown therein is provided with a casing 10 having an inner container provided with a corrugated side wall 12 and with a porous bottom in the form of a porous ceramic tile 11 which is conveniently cemented into position. Said corrugated wall 12 is surrounded by one or more layers of heat insulating material 13. There is also provided within said container a mass of refractory particles 14 which in use is fluidised by a gaseous medium flowing upwardly through said porous tile.

Protection is given to the porous tile 11 and associated fixing cement by arranging that a layer 8 of refractory particles immediately adjacent to the tile is formed of heavier (i.e. coarser (larger) and/or denser) particles then are used for the remainder of the bed comprised of said particles 14. Thus, for example, said layer 8 of particles adjacent to the tile may be formed of $Al_2O_3$ particles of 1480$\mu$ (14 mesh) size, (mean diameter) whereas the remainder of the bed may be formed of $Al_2O_3$ particles of 250$\mu$ (60 mesh) size, (mean diameter) the nominal specific gravity of the $Al_2O_3$ particles being 3.96. A grid 9 is also preferably provided between said layer 8 and the conduit means 17 to prevent articles being treated from entering the lowermost part of the bed. The velocity of the gas flow through the bed is arranged in relation to said lowermost layer and the remainder of the particles so that the smaller and/or lighter particles will be fluidised but the heavier particles forming the bottom layer will not be fluidised. Said bottom layer thus provides a thermal insulation for the porous tile 11 which will also assist in keeping the upper surface of said tile at a relatively low temperature. Furthermore, the fluidised bed is provided with a removable hood 23 which can be removed in order to insert articles into or remove them from the bed, said hood incorporating a baffle 24 and wire mesh 25 which, in use, serves to prevent the escape of refractory particles from the bed.

The articles to be heat treated are immersed in the mass of refractory particles 14 when fluidised and the gaseous medium that is used to fluidise the particles will also provide the desired treatment atmosphere. In FIG. 1, said particles are shown in the fluidised condition and the upper surface of the particles is indicated by reference numeral 15. It will also be necessary to heat said refractory particles and in one method the gaseous medium within the bed may also be used to provide the heat before treatment commences.

Beneath said container there are provided first conduit means in the form of one or more pipes or passages 16 which are connected to a supply of air and a supply of combustible gas. The gas and air are conveniently premixed before they impinge on the underside of said porous tile 11 but in any event the proportions of the gas and air are such that the resulting mixture is initially of non-stoichiometric proportions. Such mixture may be rich in gas but alternatively it may be arranged to be rich in air, depending on the treatment that is required to be given to the articles which are to be immersed in the fluidised bed.

Figure 2:
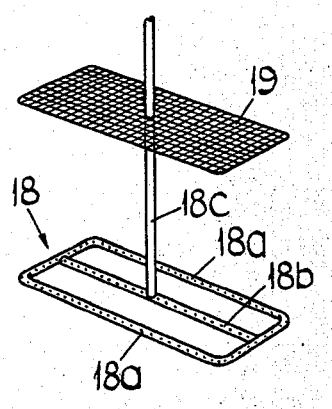
FIG. 2 is a perspective view of alternative further conduit means that can be incorporated in a fluidised bed used in carrying out a method in accordance with the invention.

There is also provided further conduit means which are shown in the example of FIG. 1 comprise one or more apertured pipes 17 which are secured in position so that they extend across the bed of particles 14, said pipes 17 being disposed in a position in which they lie nearer to the upper surface of said tile 11 than to said upper surface 15 of the refractory particles. As an alternative to said pipes 17, said further conduit means may comprise, as shown in FIG. 2, a removable apertured pipe grid 18 which can be lowered into the bed when desired. Thus, for example, there may be provided a grid which in plan view comprises a generally rectangular portion 18a together with a further straight portion 18b which interconnects the two shorter sides of the grid and which is parallel to the two longer sides, said further straight portion being connected midway along its length to an inlet pipe 18c which extends in a direction perpendicular to the plane of the grid and which also serves as a hanger, the upper end of the said inlet being connectible to a flexible hose (not shown) through which gas or air can be passed. There may also be provided a sheet of wire mesh 19 or like material which is mounted on the aforesaid inlet pipe connected to the apertured grid, said mesh being arranged in a plane parallel to the plane of the grid and being disposed above the grid but at a position so that in use it will also be immersed in the particles 14 so that it acts as a means to inhibit the formation of large bubbles of gas at the top of the bed. The grid itself is formed with a plurality of apertures and with the grid suspended within the mass of refractory particles at a position above but spaced from the porous tile 11 gas or air can flow from the inlet pipe 18c into the grid and then out of the apertures in the grid and into the refractory particles 14 where it will mix with the non-stoichiometric mixture flowing upwardly from the upper surface of the porous tile 11 so as then to form a combustible, such as a stoichiometric mixture. Thus where the non-stoichiometric mixture flowing upwardly through the porous tile from the conduit means 16 is rich in gas, air will initially be blown in through the aforementioned apertured grid 18 or pipes 17 to form the stoichiometric mixture. On the other hand if an air rich mixture is blown through the porous tile 11 then a further supply of combustible gas is initially injected into the bed through the aforesaid apertured grid 18 or apertured pipes 17.

Figure 4:
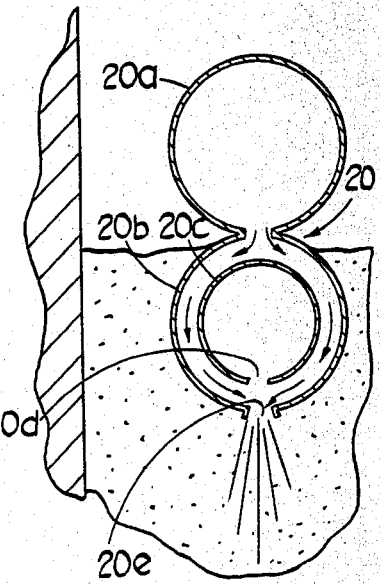
FIG. 4 is a fragmentary schematic view showing in greater detail a part of the construction seen in FIG. 1.

When the stoichiometric mixture has thus been formed as above described the mixture will flow upwardly through the bed comprised of particles 14 which will become fluidised by the flow itself and ignition of the mixture can be initially effected just above the top of the bed—i.e. just above the surface 15. As the temperature of the bed increases the flame front will extend downwardly through the bed of particles 14 but will not reach the upper surface of the porous tile 11 itself because of the presence of the non-fluidised layer 8 and the tile, together with the aforesaid cement, will not therefore be subjected to unduly high temperatures. Initial heating of the bed can thus take place as above described and when the desired temperature has been reached, and if the aforesaid apertured grid 18 has been used, it can be removed from the bed whereafter the non-stoichiometric mixture flowing upwardly from the porous tile will provide the necessary treatment atmosphere and also the fluidising medium. Articles to be treated will then be introduced into the fluidised bed after said hood 23 has been temporarily removed, said articles being contained in a perforated basket if desired. In order however that the grid 18 may be in position prior to commencing operation it can be inserted into the bed while the latter is still fluidised just before a prior period of operation finishes. Alternatively the bed 14 will have to be fluidised by the non-stoichiometric mixture blown in from beneath the porous tile before the grid is inserted. It will however be necessary to maintain the desired operating temperature and this can be done by effecting combustion of a gas/air mixture either just above or within the upper part of the bed of refractory particles 14, such combustion zone having the effect of supplying heat to the bed. In FIG. 1, there is shown third conduit means in the form of one or more apertured pipes 20 which are disposed just below the surface 15 and which are shown in greater detail in FIG. 4. Thus, the or each pipe 20 comprises an upper part 20a which is in communication with a lower part 20b and concentrically mounted within the latter is an inner pipe 20c arranged to carry a non-combustible gas/air mixture. Said inner pipe 20c has apertures 20d in its bottom surface through which said mixture can pass. Said upper part 20a can be used to convey air when desired so that when a temperature boost is required after the initial heating, air will be admitted to part 20a by means of a connection (not shown) and will then flow into part 20b and around pipe 20c to mix with the gas/air mixture flowing from apertures 20d. There is now formed a combustible mixture which will flow through the apertures 20e in the bottom surface of part 20b and which will ignite and provide combustion within the upper part of the bed 14. Such combustion can of course be stopped by cutting off the air supply to part 20a or the gas/air mixture supply to the pipe 20c or both of such supplies.

Figure 3:
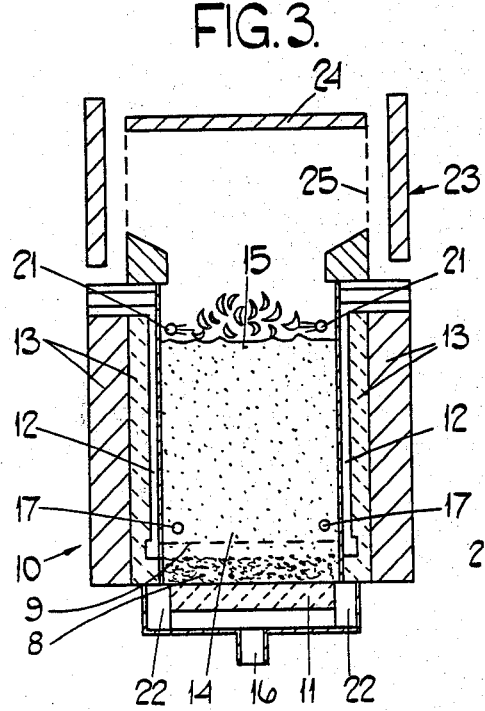
FIG. 3 is a schematic sectional view showing an alternative form of fluidised bed which can be used in carrying out a method in accordance with the invention.

In an alternative arrangement shown in FIG. 3, said third conduit means comprises one or more apertured pipes 21 which are disposed just above the upper surface 15 of the fluidised particles and in this case when it is desired to boost the temperature of the fluidised bed, air or a gaseous fuel, as the case may be, is blown through said apertured pipes 21 to form with the gas which flows upwardly through the fluidised bed (and which has provided the desired treatment atmosphere) a stoichiometric mixture which is then ignited to form a kind of "fireball" just above said surface 15 and thereby heat the bed. Thus in the case of FIG. 3, heat can be supplied from time to time from a "fireball" formed just above the bed whereas in the case of FIG. 1 the additional heat will be supplied from combustion taking place within the upper part of the bed. In both cases however temperature control of the fluidised bed may be improved by blowing air upwardly over the exterior of the corrugated wall 12 and in the space between the corrugations and the insulation 13. Thus if it is required to operate the bed (after the initial warming up) at a given temperature then a fall of temperature below the given level can be corrected by admitting either air or gas, as the case may be, through the pipes 20 or 21 to provide combustion within or just above the upper part of the bed. On the other hand, a rise of temperature above the desired level can be corrected by blowing cooling air over the exterior of said wall 12 as previously mentioned. If desired, the initiation of combustion and the introduction of cooling air can be controlled automatically by means of a thermostat arranged to maintain the desired temperature. Cooling air is also desirably supplied through ducts 22 beneath the container 10 in order to maintain the supporting structure of the fluidised bed, the underside of the porous tile 11 and the incoming gas and air mixture in a relatively cool condition.

I claim:

1. A method of heat treating articles by immersing them in a fluidised bed comprising a container having a porous base and containing a mass of refractory particles, comprising the steps of:

arranging a layer of said refractory particles immediately adjacent to said porous base, the layer being formed of particles having a sufficiently larger mean diameter so as to remain unfluidised, the remainder of said refractory particles being fluidisable;

supplying a non-stoichiometric fluidising and treatment medium to the underside of said porous base and allowing said medium to flow therethrough and into said mass of refractory particles at such a velocity as will leave said layer of larger mean diameter refractory particles unfluidised while forming a fluidised layer thereabove from said remainder of said refractory particles;

introducing a gaseous medium into said container at a position above and spaced from said porous base, at least one of: said gaseous medium; and, a mixture of said gaseous medium and said fluidising medium, being a combustible product; and, igniting said combustible product and thereby heating said fluidised layer of refractory particles, whereby said porous base is thermally shielded from said fluidised layer by said layer of larger mean diameter unfluidised particles which remain substantially cooler than the fluidised particles.

2. A method of heat treating articles as claimed in claim 1 wherein said gaseous medium is introduced into said container at a position adjacent to the upper surface of said mass of refractory particles.

3. A method of heat treating articles as claimed in claim 2, wherein combustion is established within the upper part of said mass of refractory particles.

* * * * *